UNITED STATES PATENT OFFICE.

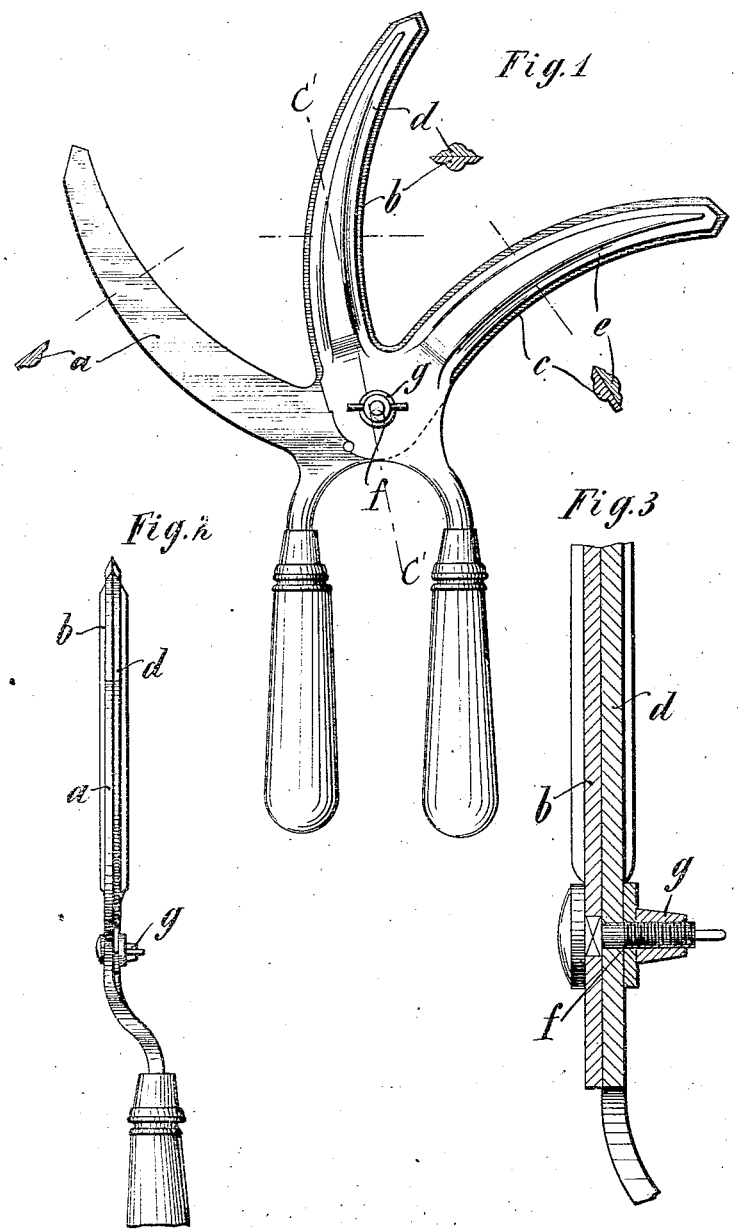

JOHANN JURITSCH, OF KLAGENFURTH, AUSTRIA-HUNGARY.

SHEARS FOR CLIPPING HEDGES.

SPECIFICATION forming part of Letters Patent No. 664,870, dated January 1, 1901.

Application filed January 10, 1900. Serial No. 1,029. (No model.)

*To all whom it may concern:*

Be it known that I, JOHANN JURITSCH, a citizen of Austria, and a resident of and whose post-office address is Klagenfurth, Austria-Hungary, have invented certain new and useful Improvements in Shears for Clipping Hedges, of which the following is a specification.

The object of my invention is shears for clipping hedges, which effect a fast and perfect clipping without necessitating any great exertion. These shears are provided with five blades, two of these belonging to the upper part of the shears and the lower middle blade is two-edged.

In the accompanying drawings, Figure 1 gives a view of the shears when closed, while Fig. 2 is a side view of the same, and Fig. 3 shows an enlarged lengthwise cut corresponding to line C' C' of Fig. 1.

The shears show five blades or knives $a\ b\ c\ d\ e$. The upper half has two two-edged blades $d\ e$, slightly bent and integral with one handle, while on the lower half there are three similarly-shaped blades $a\ b\ c$, secured upon another handle, which handles are pivoted upon each other, as is ordinary. Of these only the middle one $b$ is two-edged, while the outer ones $a$ and $c$ have only one cutting edge on the inner side. All the five blades are slightly bent in the same direction. The two parts of the shears are joined in the ordinary way by a screw $f$ and nut $g$, located in the turning point. By this peculiar arrangement of the blades, in combination with their two edges, a fourfold cut is effected whenever the shears are opened or closed. These shears, therefore, far surpass any of the older systems of shears in quickness and efficiency, and even the unpracticed are able to effect a faultless cut with the utmost facility.

The turning movement of the two parts of the shears may either be limited by pins fastened in convenient places of the lower left-hand blade or a pin fastened to the upper half of the shears, and terminating in a semi-circular head may catch in the lower half.

The bent shape of the blades effects a drawing cut, while the old type of clipping-shears only squeeze the branches off.

I claim—

Shears for clipping hedges having five blades, whereof there are upon one handle two outside blades having cutting edges on the inside thereof, and the middle blade having edges on both sides, and two blades upon the other handle, both sides of both of the last-named blades having cutting edges whereby an engagement with both sides of the middle blade, and the inside of both of the outer blades of the first series is effected by the two blades of the second series, substantially as and for the purpose set forth.

In testimony whereof I affix my signature in presence of two witnesses.

JOHANN JURITSCH.

Witnesses:
 ANTON OHRFANDL,
 J. OTHER GRAF V. ORSONI ROSENBERG.